Feb. 22, 1972 R. VEILEX ET AL Re. 27,293

SEMICONDUCTOR DEVICE FOR PRODUCING AND AMPLIFYING ELECTRICAL SIGNALS OF VERY HIGH FREQUENCY

Original Filed June 6, 1967

INVENTOR.
ROBERT VEILEX

BY
Frank R. Trifari
AGENT

United States Patent Office

Re. 27,293
Reissued Feb. 22, 1972

27,293

SEMICONDUCTOR DEVICE FOR PRODUCING AND AMPLIFYING ELECTRICAL SIGNALS OF VERY HIGH FREQUENCY

Robert Veilex, Paris, France, by U.S. Philips Corp., assignee, New York, N.Y., assignor to U.S. Philips Corporation, New York, N.Y.

Original No. 3,458,831, dated July 29, 1969, Ser. No. 644,001, June 6, 1967. Application for reissue Feb. 12, 1970, Ser. No. 14,883
Claims priority, application France, June 10, 1966, 65,098
Int. Cl. H03b *5/32, 7/14;* H03f *3/04*
U.S. Cl. 331—107 A 12 Claims

Matter enclosed in heavy brackets [ ] appears in the original patent but forms no part of this reissue specification; matter printed in italics indicates the additions made by reissue.

ABSTRACT OF THE DISCLOSURE

A semiconductor device for producing and amplifying electrical high frequency signals comprising an elongate body of monocyrstalline piezoelectric material which exhibits a negative resistance characteristic over a portion of the current-voltage characteristic thereof. The body which may consist of gallium arsenide and cut with its longest dimension in the (1.1.0) direction has one end thereof operated at a field intensity at which the material exhibits its negative resistance characteristic thereby to generate at this end electrical and concurrent acoustical oscillations. The acoustical oscillations are coupled to the intermediate portion of the rod which is subject to an electric field which brings about an amplified acoustic oscillation. The terminal end portion of the elongated body is operated at a potential at which the material thereof exhibits a negative resistance characteristic whereby the impinging acoustic oscillations from the intermediate portion bring about an output amplified signal.

This invention relates to a device for producing and amplifying electrical high-frequency signals, comprising at least one structural unit constituted by at least a first transductor which can convert electrical energy supplied into high-frequency acoustic oscillations, a piezo-electric member, for example, in the form of a rod, which can transfer and amplify the acoustic oscillations from the first transductor by the action of an electric field, set up across the member, and a second transductor which can convert the acoustic oscillations from the piezo-electric member into electric current oscillations.

It is known that electrical oscillations of very high frequency may be produced or, under certain conditions, amplified due to a phenomenon known under the name of "Gunn-effect," which phenomenon occurs in certain semiconductors (for example Ga As) and becomes apparent in the [persence] *presence* of a portion of negative dynamic resistance in the current-voltage characteristic. In fact, when certain direct [vlotages] *voltages* are set up across the semiconductor body, regions of high resistivity and high electric field strength then occur, which move from one electrode to the other. Furthermore, if the electric voltage is applied in the form of pulses each of which can produce the Gunn-effect, possibly in co-action with a polarisation voltage, these regions of high resistivity will succeed one another in the rhythm of the pulses. These moving regions of high resistivity and high field strength bring about a transverse oscillation of the cystal lattice due to a piezo-electric effect.

The Gunn-effect can occur only in those semiconductors in which secondary energy minima exist above the lowest or main minimum of the conduction band, which secondary energy minima lie at a fairly small distance from the main minimum and at the level of which the effective mass of the electrons is considerably greater than the effective mass of the electrons whose energy lies in the direct vicinity of the main minimum. A sufficiently strong electric field causes a transfer of electrons from the main minimum to a secondary minimum where their lower mobility causes a decrease in the current flowing through the semiconductor body. An increase in the electric field is then attended with a decrease in the current flow through the body, resulting in a negative dynamic resistance occurring.

Devices causing the said effect and operating discontinuously with pulses permit of producing powers of important peak values, but the mean power available remains low notably for reasons of heat dissipation.

An object of the present invention is to obviate or at least mitigate this disadvantage to a considerable extent. The invention more particularly relates to amplifying devices adapted to co-act under satisfactory conditions with a Gunn-effect generator, and to means for matching the operation of several Gunn-effect generators to a given "programme." The invention makes it possible to have the disposal of higher powers by suitable amplifications of the available signal, possibly attended with an increase in recurrence frequency of the wave trains obtained with several sequential Gunn-effect amplifiers which serve to transmit an initial wave train.

It is also known that in a semiconductor crystal having piezo-electric properties and subject to a strong electric field the direction of which corresponds to a piezo-electrically active direction of the crystal, the attenuation of the "phonons" (this is the name for oscillation energy quanta associated with vibrations of the crystal lattice) caused by the electrons becomes negative when the electric field reaches a value such that the travelling rate of the electrons is sufficiently higher than the rate of propagation of the phonons.

The rate of propagation of the phonons corresponds to that of an acoustic wave in the medium under the conditions considered.

The amplification phenomenon may be considered as a stimulated emission of phonons: the distribution of the phonons in the reciprocal space is displaced by the action of the electric field in such manner that the chance of emission of a phonon is greater than the chance of absorption.

The experiments carried out, the studies and the results published hitherto related to devices in which start was made from a heterogenous transductor element, for example, a quartz crystal, which is mechanically coupled to a piezo-electric semiconductor member (for example, a rod of cadmium sulphide) which in turn drives a second quartz transductor acting as a receiver. In this connection mention may be made of the articles published by A. Hutson, J. MacFee and D. White (Physical Review-Letters, No. 7, page 237, year 1961) and by D. White (Amplification of Ultrasonic Waves in Piezo-electric Semiconductors, Journal of Applied Physics, vol. 33, No. 3, August 1962, pages 2547 to 2554). The rough output of such devices is very low, since it is difficult to obtain satisfactory piezo-electric couplings between the transductors employed and the semiconductor rod.

According to the invention the transductors and the piezo-electric member mentioned hereinbefore form part of the same monocrystalline semiconductor piezo-electric body, means being provided for setting up an electric potential difference across at least part of the said body, the current-voltage characteristic of the body including a portion of negative dynamic resistance the use of which underlies the performance of the transductors.

Such a semiconductor piezo-electric body advantageously consists of gallium arsenide.

Such a device may operate either as a generator or as an amplifier of electrical signals of very high frequencies. As previously mentioned, the Gunn-effect may occur in the first transductor either at a sufficient polarisation voltage (higher than 1500 volts/cm. for GaAs at room temperature) or if, in addition to a polarisation voltage, signals to be amplified are fed thereto.

Whichever the operation of the first transductor may be, the recurrent moving regions cause in the first transductor transverse vibrations of the crystal lattice, which are imparted to the rod, due to a piezo-electric effect. The said rod amplifies the vibrations due to the interaction between electrons and phonons *and* transfers then to the second transductor the electrodes of which are biased. Since the said vibrations are attended with an electric field of piezo-electric origin, the Gunn-effect occurs in the second transductor which provides between its electrodes electrical signals of very high frequency in the form of oscillations of the current flowing through it.

Since the device described is incorporated in the same monocrystal body, the coupling losses between the transductors and the rod are low, the device thus acquiring a considerable gain factor.

In order that the invention may be readily carried into effect, it will now be described in detail, by way of example, with reference to the accompanying diagrammatic drawing, in which.

Figure 1:
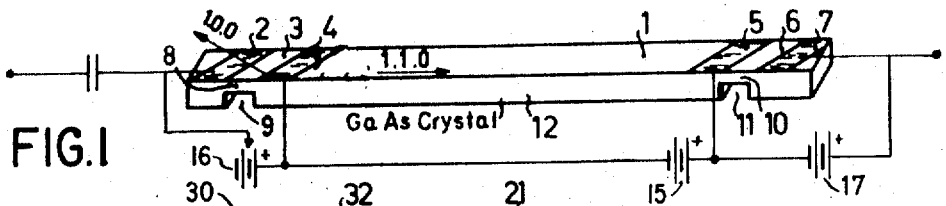
FIGURE 1 shows one embodiment of a device according to the invention.

The device shown in FIGURE 1 comprises a rectangular monocrystal plate 1 of gallium arsenide, the long sides of which are parallel to the (1.1.0) direction of the crystal. The plate 1 is provided on its upper surface with four parallel electrodes 2, 4, 5 and 7 which may be formed, for example, by vapour deposition of a tin-silver alloy, nickel or an indium-gold alloy. The said electrodes in the upper surface of the plate 1 are at an angle of 45° with the (1.1.0) direction of the crystal so that an electric voltage applied between two of said electrodes causes an electric field parallel to the (1.1.0) direction of the crystal 1. Between the electrodes 2 and 4 formed at one end of the plate 1, there subsists an elongated and comparatively narrow region 3 at right angles to which a region 8 of the crystal has a thickness which is less than that of the plate 1 due to the presence of a groove 9 formed in the plate in parallel with the contact strips 2 and 4. The other end of the plate 1 with the electrodes 5 and 7, an intermediate region 6, a region 10 and a groove 11 is similar to the end above described.

The plate 1 has a comparatively small width relative to the distance between the electrodes 4 and 5, and hence the electric field which prevails in the thickness of a central region 12 of the plate 1 when an electric voltage is set up between the electrodes 4 and 5, is substantially parallel to the (1.1.0) axis of the crystal.

The electrodes 2, 4, 5 and 7 may serve as contact elements for applying the electric voltages necessary for the operation of the device, for the supply of signals to be amplified and for taking off amplied signals. Further, connecting conductors of suitable diameter may be soldered to the said electrodes, for example, by using thermo-compression bonding.

Figure 2:
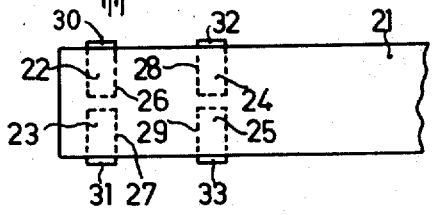
FIGURE 2 shows another embodiment of the device of FIGURE 1.

FIGURE 2 shows, on an enlarged scale, one end of a monocrystal plate 21 of gallium arsenide, which is comparable to the plate 1 of FIGURE 1, but which has a different structure of the electrodes. This end of the plate 21 comprises four regions 22, 23, 24 and 25, in which a donor such as, for example, tellurium, selenium, or silicon has been diffused into the GaAs and on which contact electrodes 30, 31, 32 and 33 are provided. The electrodes 30 and 31, on the one hand, and the electrodes 32 and 33, on the other, are electrically connected together. Thus, the electrode pair 30, 31 is comparable to the electrode 2 of FIGURE 1, and the electrode 4 of the latter figure corresponds to the electrode pair 32, 33.

The operation of the semiconductor device of FIGURE 1 may be explained as follows: The portion of the plate 1 which comprises, for example, the electrodes 2 and 4 associated with the region 8, may be used as an oscillator or as a Gunn-effect amplifier. The central part 12 which is surrounded by the electrodes 4 and 5 and subjected to the electric field originating from a suitable potential difference i.e. a battery is applied between the electrodes 4 and 5, is used as an amplifier due to the interaction between electrons and phonons in the central part 12, which amplification depends upon the piezo-electric properties of the semiconductor body. The coupling between the oscillator or Gunn-effect amplifier 2, 4, 8 and the central part 12 is of a piezo-electric nature. The right-hand part of the plate which is formed by the electrodes 5 and 7 associated with the region 10, is used as a Gunn-effect amplifier and is likewise piezo-electrically connected to the central part 12.

It is known that the occurrence of an astable current in oscillators or amplifier devices which gives rise to the physical phenomenon which is very generally termed "Gunn-effect," results from the presence of a portion of negative dynamic resistance in the characteristic $I=f(U)$ which shows the current flow I through the semiconductor body as a function of the voltage U applied thereto. See, for example, the portion between points 35 and 36 of the curve of FIGURE 3, which is shown in broken line because of the difficulty or practical impossibility of accurate measurement of the said portion of the curve due to the spontaneous current oscillations of very high frequency.

It is also known that spontaneous occurrence of current oscillations depends upon the existence of a sufficiently strong field in the semiconductor body concerned. As a function of the length of the region governed by the Gunn-effect and of the characteristics of the associated high-frequency circuit, this spontaneous beginning may occur, for example, with electric fields from approximatel 1500 volt/cm. to approximately 3000 volt/cm.

Figure 3:
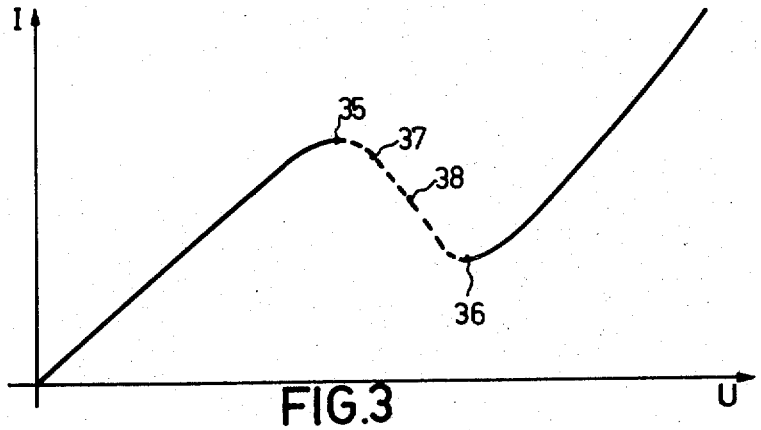
FIGURE 3 shows an example of a current-voltage curve of a semiconductor body which can produce the Gunn-effect.

To make the left-hand portion of the plate 1 of FIGURE 1 function as an amplifier it is possible, for example, to connect the electrode 4 to the positive terminal of an adjustable direct voltage source 16 and to adjust the negative voltage applied to the electrode 2 in such manner that the work-point comes at a position such as point 37 of the curve of FIGURE 3, whilst the signal to be amplified may be capacitively applied to the electrode 2. Depending on the accurate position of point 37 and the amplitude of the signal applied, the relevant signal is amplified due to the negative resistance effect of the characteristic or to the formation of regions of high resistivity which regions leave the electrode 2 and propagate at high speed towards the electrode 4.

The length of the region 8 and the effective electric field determining the period of propagation of the region of high resistivity from the electrode 2 to the electrode 4 must be matched within a certain extent to the operating frequency of the device. This matching is not critical and satisfactory operation of Gunn-effect amplifying devices has already been obtained in a frequency range which governs an octave.

To make the left-hand part of the plate 1 operate as a generator, the negative voltage set up at the electrode 2 must be increased so that the work-point of the region 8 comes at an area, such as point 38 of the curve of FIGURE 3, which advantageously lies in the central region of the portion of negative slope of the said curve.

The presence in region 8 of a moving region of high resistivity and a strong electric field is attended with a direct piezo-electric effect which gives rise, in the region in which the said region propagates, to a transverse vibration of the crystal lattice, which is transferred in the semiconductor material to the region 12 outside the electrode 4.

The vibration is transferred from the region 8 to the region 12 with a certain attenuation, but since the velocity of the charge carrier (electrons in the example chosen) in the region 12 is considerably higher than the rate of propagation of the transverse vibration of the lattice, the strength of the vibration is increased as it propagates along the region 12.

It is known that the amplification obtained varies with the electric field applied to the semiconductor in the region 12 and with the length of said region; the amplification factor to be used is limited by the occurrence of a spontaneous vibration due to the formulation of a region in which the density of the phonons is considerably higher than the natural thermal density of the phonons, resulting in a decrease in mobility of the electrons which propagate together with the phonons, the coupling between electrons and phonons no longer being linear. The strength of the electric field with which this instability occurs, varies with the Ga As bodies employed and with temperature, it may be, for example, between 800 volt/cm. and 1000 volt/cm. at the amibent temperature.

When using a GaAs body with an electron mobility of 6500 sq. cm./v. sec. (hence 6500 cm./s. per v. cm.) the electron speed is $6500 \times 700$ is $4.55 \times 10^6$ cm./s. for a fiield of 700 volt/cm., whereas the rate of propagation of a shear wave with a transverse vibration of the crystal lattice is only approximately $3.35 \times 10^5$ cm./s.

These conditions are very favourable for obtaining a high gain factor in the region 12, the gain obtained being adjustable within wide limits by controlling the electric field in the said region between, for example, 100 volt/cm. and 800 volt/cm.

When the acoustic wave injected from the region 8 into the region 12, after having been amplified, reaches the electrode 5, it propagates with slight attenuation to the region 10 in which it causes via the electric fiield of piezoelectric origin which is attended therewith, the beginning of Gunn-effect oscillations by means of a suitable control of the voltage from source 17 which is applied to the electrode 7 and positive relative to the electrode 5. As a function of the potential of the electrodes 2 and 4, the current flow through the electrode 7 will thus reproduce either the ultra-high frequency signal applied to electrode 2, or the signal produced at the level of electrode 4, with three fold amplification due successively to the Gunn-effect in the region 8, to interaction between electrons and phonons in the region 12, and again to the Gunn-effect in the region 10.

The partial gain factors thus obtainable are of the order of ten db in the regions with Gunn-effect and of the order of a few tens of db per centimetre length of the region 12 upon amplification due to interaction between electrons and phonons.

Figure 4:
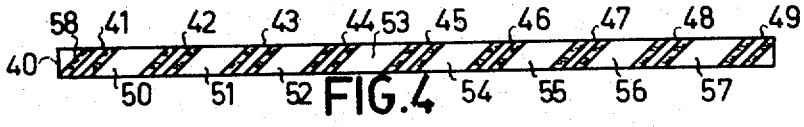
FIGURE 4 shows a variant of the device according to the invention which provides wave trains shifted in time relative to an initial wave train.

The device shown in plan view in FIGURE 4 corresponds to a plurality of devices of FIGURE 1 incorporated in the same semiconductor plate, in order to obtain an accurate sequence of signal trains from an initial signal train of pulsatory character, it being general advantageous that these signal trains are evenly divided in time. The device shown in FIGURE 4 is manufactured starting from a plate 40, having regions 41 to 49 with Gunn-effect amplification which are coupled together by regions 50 to 57 with amplification due to interaction between electrons and phonons. The regions 50 to 57 are comparatively short relative to the region 12 of FIGURE 1 and the amplification to be provided by them serves only to compensate for the losses caused by the piezoelectric couplings between the input and output of said regions with the preceding region with Gunn-effect and the succeeding region with Gunn-effect. The length of the regions 50 to 57 is determined as a function of the time difference between the signals produced by the regions with Gunn-effect.

A wave train of pulsatory character which is fed to input electrode 58 of the region 41 first causes the action of region 41 as an amplifier and then successively the action of the regions 42 to 49. In such a device the region 50 could also have a more important specific amplifying effect and the region 41 could be used as a Gunn-effect oscillator with pulsatory action.

Figure 5:
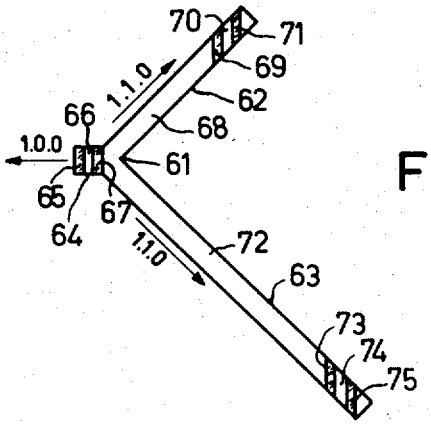
FIGURE 5 shows another embodiment of the device according to the invention which provides two wave trains which have been amplified, delayed and shifted relative to an initial wave train.

The device shown in plan view in FIGURE 5 comprises a monocrystal 61 of gallium arsenide, which has been cut in a special way and notably comprises two branches 62 and 63 each extending in one of the (1.1.0) directions of the crystal. A third branch 64 of much smaller length extends in the (1.0.0) direction of the crystal. The branch 64 includes two electrodes 65 and 67, which are similar to the electrodes 2 and 4 of FIGURE 1 and enclose a region 66 similar to the region 3 of FIGURE 1, which assembly may be used notably as a Gunn-effect amplifier.

The branch 62 has a central region 68 and terminates in a Gunn-effect amplifier comprising electrodes 69 and 71 which surround a central region 70 which corresponds to the region of the crystal where the Gunn-effect occurs. The central region 68, which is subject to the electric field originating from the potential difference between the electrode 67 and 69, is used for obtaining amplification due to interaction between electrons and phonons.

The branch 63 includes a central region 72 and terminates in a Gunn-effect amplifier comprising electrodes 73 and 75 which enclose a central region 74. The central region 72 fulfills the same function as the region 68.

The device of FIGURE [4] *5* may notably be used as follows: UHF-wave trains of pulsatory character are fed to the electrode 65 of the branch 64 and cause action of the Gunn-effect device 64–65–66, which brings about amplification of the oscillations applied.

The acoustic waves resulting from the Gunn-effect in region 66 propagate outside the electrode 67 in the two branches 62 and 63 and are amplified in the regions 68 and 72.

The absolute values of the lengths of the regions 68 and 72, together with the difference between these two lengths, will be chosen to be such that the desired time shift is obtained between the two wave trains amplified by the Gunn-effect devices at the ends of the branches 62 and 63. The length of the region 68 determines the maximum amplification obtainable from the said region. The potential difference between the electrodes 67 and 73 may notably be adjusted so that the rough amplification obtained in the branch [67] *63* is similar to that obtained in the branch 62.

It will be apparent that, starting from a pulsatory signal train having a given energy level, said device permits of obtaining two trains of amplified signals the time phases of which result from the original signal and the characteristics of the device employed. A cascade connection of devices such as shown in FIGURE 4 permits amplification in time of the amplified signal trains and also provides for accurate recurrence thereof, starting from the initial signal.

The embodiments shown in FIGURES 1, 4 and 5 are only arbitrary simple examples of possible forms of devices according to the invention and it will be evident that complexer combinations of a plurality of devices such as shown in FIGURES 1, 4 or 5, which are connected in cascade or in parallel or by these two combined methods, lie within the reach of a man skilled in the art without passing beyond the scope of the invention.

It will also be evident that devices according to the invention have unidirectional properties as regards the circulation of an electromagnetic wave fed in the form of a signal to one extremity of these devices.

It will further be evident that modifications may be made to the embodiments described, for example, by substituting equivalent technical means.

What is claimed is:

1. A device for producing and amplifying electrical high-frequency signals, comprising a monocrystalline semiconductor piezo-electric body having first and second end portions and an intermediate portion, said body being constituted of a material exhibiting a negative dynamic resistance characteristic over a portion of the current-voltage characteristic thereof, electrode means arranged on the first end portion, means for generating an electrical wave and concurrent acoustic oscillations in said first end portion comprising means for applying to said electrode means an operating potential having a value at which the material of said end portion exhibits said negative resistance characteristic, means for applying an electric potential across said [immediate] *intermediate* portion thereby to amplify acoustic oscillations applied thereto from said end portion, electrode means arranged at the second end portion, means for applying to said latter electrode means a potential having a value at which the material of the second end portion exhibits a negative resistance characteristic and electrical variations as determined by acoustic oscillations applied thereto from said intermediate portion, and electrical output means coupled to said second end portion.

2. A device as claimed in claim 1, characterized in that the semiconductor piezo-electric body consists of gallium arsenide.

3. A device as claimed in claim 2 wherein said body consists of a plate which is cut in the (1.1.0) direction of the monocrystal body.

4. A device as claimed in claim 3 wherein said electrode means comprises spaced electrically conductive coatings extending across said body at right angles to the (1.0.0) direction of the monocrystal body.

5. A device as claimed in claim 1 wherein said body consists of a plate comprising first, second and third branches extending from a common point, electrode means arranged on the end portion of said first branch for generating an electrical wave and concurrent acoustic oscillations in the said end portion, and electrode means arranged on the end portions of said second and third branches respectively for deriving output signals from said last-mentioned end portions.

6. A device as claimed in claim 5 wherein said plate consists of gallium arsenide and wherein said first branch is cut in the (1.0.0) direction of the monocrystal body and said second and third branches are cut in the (1.1.0) direction of the monocrystal body.

7. A device as claimed in claim 1 wherein said electrode means comprises spaced metal vapor depositions on said end portions.

8. A device as claimed in claim 1 wherein said electrode means comprises spaced coatings on said end portions of a binary or ternary alloy of metals from the group consisting of *silver*, tin, indium, nickel and gold.

9. A device as claimed in claim 1 further comprising means for applying an input signal to the electrode means of said first end portion.

10. A device as claimed in claim 1 wherein said body consists of gallium arsenide and wherein said operating potential has a value producing an electric field in said first end portion having a value greater than 1500 volts/cm. thereby to generate in said end portion an electric wave in the form of pulses.

*11. A device as claimed in claim 1 wherein said body further comprises at least one signal output portion located within said intermediate portion, electrode means arranged at said signal output portion, means for applying to said latter electrode means a potential having a value at which the material of said signal output portion exhibits a negative resistance characteristic, and electrical signal output means coupled to said signal output portion whereby a sequence of output signals is obtained from said electrical output means coupled to said output and second end portions.*

*12. A device as claimed in claim 1 wherein said electrode means comprise diffused metal contacts, said metal being an element selected from the group consisting of tellurium, selenium, or silicon.*

References Cited

The following references, cited by the Examiner, are of record in the patened file of this patent or the original patent.

UNITED STATES PATENTS

| | | | |
|---|---|---|---|
| 3,314,022 | 4/1967 | Meitzler | 330—5.5 |
| 3,365,583 | 1/1968 | Gunn | 331—107 |

OTHER REFERENCES

Applied Physics Letters, White et al., pp. 40–42, vol. 8, No. 2, Jan. 15, 1966.

ROY LAKE, Primary Examiner

S. H. GRIMM, Assistant Examiner

U.S. Cl. X.R.

317—234 V; 330—5.5; 331—107 G; 333—30